United States Patent [19]
Parsons

[11] Patent Number: 5,724,824
[45] Date of Patent: Mar. 10, 1998

[54] EVAPORATIVE COOLING DELIVERY CONTROL SYSTEM

[76] Inventor: David A. Parsons, 930 Tahoe Blvd. #802-324, Incline Village, Nev. 89451

[21] Appl. No.: 766,587

[22] Filed: Dec. 12, 1996

[51] Int. Cl.⁶ ............................................ F28D 3/00
[52] U.S. Cl. .................... 62/171; 62/304; 261/26; 261/116
[58] Field of Search .................. 62/171, 121, 304, 62/305, 306, 314; 261/24, 26, 27, 28, 30, 116; 236/44 A, 44 R; 239/75

[56] References Cited

U.S. PATENT DOCUMENTS

| | | | |
|---|---|---|---|
| 2,199,485 | 5/1940 | Vout | 261/1 |
| 3,625,434 | 12/1971 | Kitover | 239/289 |
| 3,842,615 | 10/1974 | Reigel et al. | 62/171 |
| 4,671,456 | 6/1987 | Groff et al. | 62/171 |
| 4,765,542 | 8/1988 | Carlson | 239/289 |
| 4,846,525 | 7/1989 | Manning | 297/180 |
| 5,000,384 | 3/1991 | Arnold | 239/128 |
| 5,005,367 | 4/1991 | Hwang | 62/133 |
| 5,027,455 | 7/1991 | Commissio | 5/421 |
| 5,337,960 | 8/1994 | Allen | 239/280.5 |
| 5,373,703 | 12/1994 | Pal | 62/91 |

OTHER PUBLICATIONS

"Artic Air" pamphlet by Misty Mate Inc., 3498 N. San Marcos Pl., #10, tel (602) 892-1226.

*Primary Examiner*—John M. Sollecito
*Attorney, Agent, or Firm*—Michael J. Ram; Ralph D. Chabot; Marvin H. Kleinberg

[57] ABSTRACT

A novel delivery system for delivering a fine fog of water through a plurality of nozzles to absorb heat through evaporation. The delivery system comprises the combination of a water supply tank, an air compressor, solenoid valve and an electronic control module for controlling the operation of valve and compressor to allow an operator to adjust the displacement rate of fog as well as providing the operator a choice between continuous, intermittent and pulsing operation.

4 Claims, 1 Drawing Sheet

5,724,824

EVAPORATIVE COOLING DELIVERY CONTROL SYSTEM

TECHNICAL FIELD

This invention relates to evaporative cooling systems and specifically to an operating system for providing evaporative cooling to the cabin area of an open vehicle such as a golf cart.

BACKGROUND OF THE INVENTION

Many golf courses are located in hot, and often dry, climates. This heat can limit the time of day golf courses are in use and reduce collections of greens fees. Therefore, if cooling of golfers while on the golf course can be effectively provided, the comfort of the golfers and income of the golf course could be increased. One approach is to provide a cooling atmosphere for occupants while riding golf carts. However, golf carts usually have open air cabins and therefore it is difficult to provide effective cooling for the occupants. Technological advancements in this area however, have been lacking. In particular, in open vehicles, such as golf carts, the only relief from high temperatures for an individual riding in the cart is shade from the sun provided by the vehicle's canopy and a breeze generated by traveling at a considerable rate of speed.

Recent advances in the art have led to rather limited improvements, most particularly, the delivery of a water mist to a portion of the interior cabin of a golf cart. A delivery system currently offered utilizes a positive displacement pump which discharges water from a refillable source mounted in the vehicle, the water being delivered at 100 psi through nozzles across the front of the vehicle canopy in the form of a fine mist. This system has a limited ability to control the rate of water delivered. Depending on atmospheric conditions as well as the preferences of the individuals sitting in the open vehicle, the amount of cooling or mist will vary. The mist may be too cool for some individuals and the discharge rate will have to be reduced to provide maximum comfort. Other situations may call for a higher delivery rate.

Another potential problem with the prior art evaporative cooling systems is their tendency to occasionally drip water from the nozzles. Water drops are undesirable because evaporative cooling is significantly retarded and drops tend to wet the vehicle occupants rather then providing a cooled atmosphere.

STATEMENT OF THE INVENTION

The present invention is a superior evaporative cooling delivery system for the occupants of an open cabin vehicle such as a golf cart. The delivery system comprises a compressor, power delivery means, control valves, a reservoir, a series of fog nozzles and electronic controls to maintain tank pressure and for varying the rate and/or frequency of water delivery. The compressor, when activated, provides pressurized air to the reservoir containing water.

As the air pressure increases the water is displaced from the tank through a discharge line. The discharge line connects to piping mounted around the inner periphery of the roof canopy of the vehicle, such as a golf cart. Connected to the piping is a series of nozzles through which the water exits in the form of a very fine fog which immediately evaporates, the conversion of the water fog to vapor removing heat from the ambient air and thus cooling the vehicle occupants. The compressor can be powered by normal means such as used to power the golf cart, for example a power take off from a gas powered engine or an electric battery which powers the vehicle, or a separate rechargeable battery incorporated with the cooling system. Alternatively, in a more permanent installation, a power takeoff connected to the rear wheels or rear axle can be utilized. As a further alternative, a solar cell on the roof of the canopy, which in turn charges a battery system, can be utilized.

Located within the discharge line from the water reservoir and/or the piping are one or more flow control valves, such as a solenoid valve, whose functioning is controlled from an electronic control module. The functioning of the air compressor is also controlled by the electronic control module which assures that adequate pressure is maintained to deliver the desired amount of fog. The control panel is preferably mounted in the open cabin within easy reach of the operator. The control panel provides the driver or passenger in the vehicle the ability to control the volume of fog delivered as well as delivery of the fog in a pulsing, intermittent or continuous basis. If desired, the number and/or location of the activated fog nozzles can also be controlled by the system.

The system can also be programmed to alternately operate only when the cart is in motion, only when it is not moving, only when passengers are seated in the cabin or any combination thereof, thereby providing the most efficient use of the water in the reservoir and the ability to conserve the energy used to power the compressor and provide a cooling fog only when required.

The valves allow the operator to control the delivery rate and, if so equipped, the location of the active nozzles. Alternatively, the nozzles can be manually adjusted or shut off. Accordingly, the valve can be partially closed to reduce the flow to any desired level or the valve can be alternately opened and closed at a preferred cycling rate changing the ratio of delivery time to non-delivery time of the fog. A pulsing water fog delivery is accomplished by rapid opening and closing of a solenoid valve in the discharge line.

A pressure sensor located in the air line between the compressor and reservoir or in the reservoir allows the control module to monitor the pressure applied to the water and make any necessary adjustments to the compressor operating rate. Also located in the air delivery line is a check valve to protect the compressor against the possibility of water back flow. The disclosed cooling system is also usable on other open vehicles such as tractors or farm equipment.

OBJECT OF THE INVENTION

It is an object of the invention to provide a system for the controlled delivery of an evaporative cooling fog into the open cabin of a vehicle while in transit or parked.

It is another object of the invention to provide an evaporative cooling delivery system which is controlled electronically by the operator whereby the operator can control rate of discharge, as well as program the system to operate on a continuous, intermittent, or pulsing basis.

Another object is to provide an evaporative cooling delivery system which is easy to install and simple to operate.

DETAILED DESCRIPTION OF THE INVENTION

Figure 1:
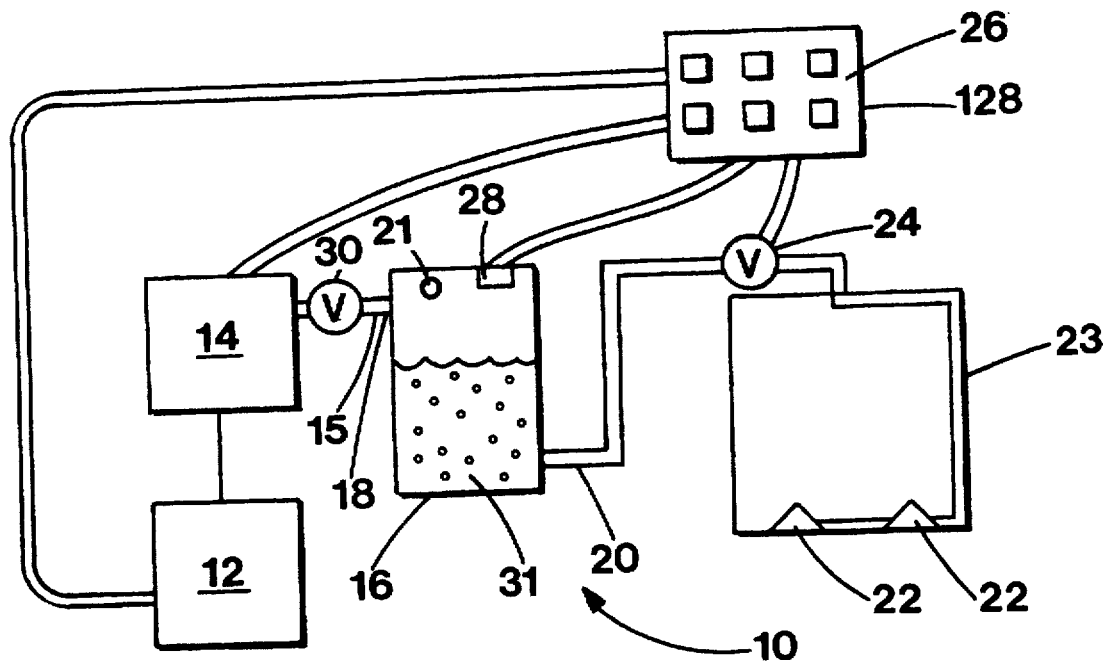
FIG. 1 is a schematic diagram of the invention.
Figure 2:
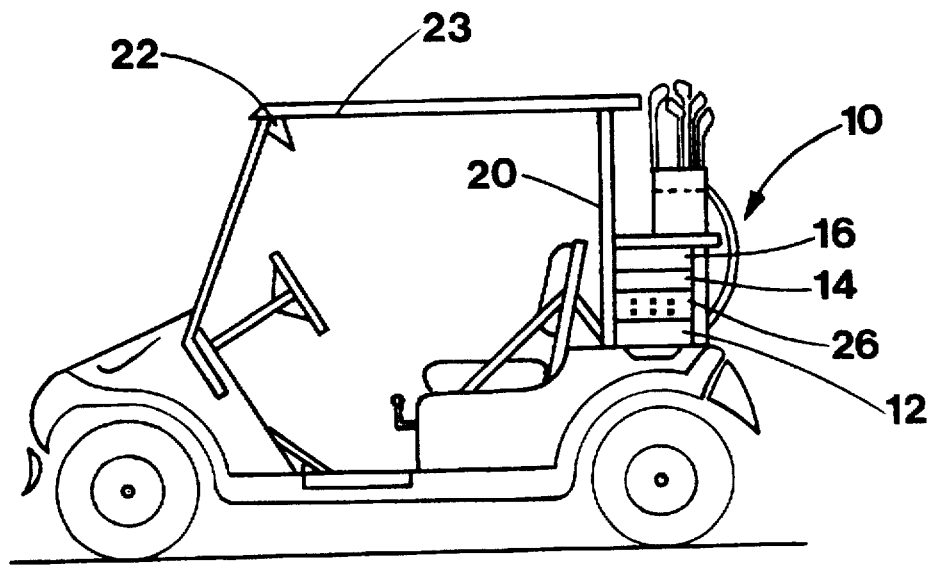
FIG. 2 is representation of a vehicle with the evaporative cooling system installed.

A schematic diagram of the delivery system 10 of the present invention is shown in FIG. 1. A power supply 12 drives a compressor 14 to compress air into outlet line 15. Reservoir 16 is sized to contain an adequate supply of water for at least one round of golf. Attached to reservoir 16 is a compressed air inlet 18 for pressurizing the reservoir 16, a discharge conduit 20 for delivering the water to the piping 23 mounted to the canopy and a fill spout 21 by which water may be added to the reservoir 16. The canopy mounted piping 23 has a plurality of spray nozzles 22 which emit the water in an atomized state or fine fog when the delivery system 10 is in operation. While a prior art system has utilized mist nozzles in a pumped system it has been found that use of a fog nozzle in the pressurized system in combination with the intermittent or pulsatile delivery unexpectedly provides more effective cooling with less water and eliminates the problem of dripping and wetting the occupants experienced with the prior system. Disposed in discharge line 20 between reservoir 16 and nozzles 22 is a control valve 24, such as a solenoid valve. Control valve 24 operates to increase or reduce the flow rate of water in the canopy mounted piping 23 as is discussed below. A control unit 26 is provided for an operator to activate the delivery system 10 and adjust its operation to a desired condition.

An electronic control module 128, or ECM within the control unit 26, is linked to power supply 12, compressor 14, solenoid valve 24, and to a pressure switch 28 which monitors the pressure in reservoir 16. ECM 128, in combination with compressor 14 and solenoid valve 24, provide delivery system 10 with the ability to vary flow rate, provide for continuous or intermittent operation with near instantaneous response relative to adjustments made from control unit 26.

A key feature is the ability of delivery system 10 to be adjusted to periodically discharge a pulse of fog through nozzles 22. ECM 128 provides alternating signals to solenoid valve 24 to open and close in rapid and successive intervals.

A check valve 30 is disposed in outlet line 15 between compressor 14 and reservoir 16 to prevent the flow of water 31 into the compressor.

In an embodiment incorporating features of the invention, the system utilizes two or more fog nozzles 22 spaced apart on the front lower edge of the cart canopy. The tank 16 is sized to hold at least 2 gallons of water 31 with a sufficient air space 15 above the water 31 in the tank 16 to hold pressurized air delivered by the compressor 12; ie., approximately 2.5 gallons. The compressor 14 is sized to deliver and maintain a pressure of at least 60 psi. It has been found that 2 gallons is usually adequate for 18 holes of golf. However nothing in the design prevents refilling the tank 16 during a game, for example at the 9th hole. The compressor 14 is designed to operate on 12 volts. However, since golf carts are currently powered by various sized rechargeable batteries from 12 to 48 volts the control system includes a converter to provide the required voltage level to the compressor irrespective of the voltage of the battery.

Although the present invention has been described in considerable detail with reference to certain preferred version and uses thereof, other versions and uses are possible. For example, the drawings show a particular embodiment and location of the components of the system. However, one skilled in the art will recognize the components of the system can be located at various locations in the vehicle or can be packaged as a single transportable unit that can be rapidly placed in an open area in the vehicle and attached to any vehicle mounted portions such as a premounted spray system or on board power delivery means. Also, while only two nozzles are shown in the front of the vehicle, additional nozzles can be used and nozzles can also be located on the other canopy edges.

Therefore, the spirit and scope of the appended claims should not be limited to the description of the preferred versions contained herein.

I claim:

1. An evaporative cooling delivery system for cooling the seating space within an open cabin vehicle comprising:

a compressor for delivering air under pressure;

a refillable reservoir which is connected to and positioned downstream of said compressor, the reservoir containing water;

a plurality of nozzles downstream of said reservoir for dispersing said water as a fog directly into the seating space of said vehicle, the fog absorbing heat by evaporation;

a valve disposed between said nozzles and said reservoir to control the displacement rate of the water from said reservoir to said nozzles;

an electronic control module having the capability to measure parameters that are indicative of the displacement rate of the water from the reservoir;

a power supply operatively connected to the compressor and the control module; and means to activate and adjust the delivery of water under continuous, intermittent and pulsing operation wherein said means adjusts the operation of said compressor and said solenoid valve accordingly.

2. The evaporative cooling delivery system of claim 1 further comprising a check valve disposed between said compressor and said reservoir.

3. An evaporative cooling delivery system for use in the cabin of an open air vehicle, the delivery system having operatively connected a power supply, refillable water reservoir, a supply of water in the reservoir, and a plurality of nozzles for discharging a fine fog of water to absorb heat by evaporation, the improvement comprising:

an electronic control module to control the flow rate of the water from the reservoir;

a compressor to provide pressurized air to the reservoir;

a valve disposed between the nozzles and the reservoir, said valve being responsive to control signals from the control module to vary the flow of water between said reservoir and said nozzles; and means to activate and adjust said delivery system between continuous, intermittent and pulsing operation wherein said module adjusts the operation of said compressor and said solenoid valve accordingly.

4. The evaporative cooling delivery system of claim 3 further comprising a check valve disposed between said compressor and said reservoir.

\* \* \* \* \*